United States Patent [19]
Hill et al.

[11] Patent Number: 5,665,144
[45] Date of Patent: Sep. 9, 1997

[54] METHOD AND APPARATUS UTILIZING HYDROCARBON POLLUTANTS FROM GLYCOL DEHYDRATORS

[76] Inventors: D. Jeffrey Hill; E. Todd Wiggins, both of Rte. 4, Box 1109-80, Edmond, Okla. 73034

[21] Appl. No.: 570,790

[22] Filed: Dec. 12, 1995

[51] Int. Cl.⁶ .......................... B01D 19/00; B01D 53/26
[52] U.S. Cl. ..................... 95/179; 95/193; 95/209; 95/231; 96/173; 96/185; 96/218; 55/228
[58] Field of Search .................... 55/228; 95/179, 95/186, 193, 209, 231; 96/157, 173, 174, 183–185, 201, 218

[56] References Cited

U.S. PATENT DOCUMENTS

| | | | |
|---|---|---|---|
| 3,616,598 | 11/1971 | Foral, Jr. | 95/193 X |
| 3,875,019 | 4/1975 | Cocuzza et al. | 203/18 |
| 4,225,394 | 9/1980 | Cox et al. | 203/37 |
| 4,273,620 | 6/1981 | Knobel | 203/18 |
| 4,322,265 | 3/1982 | Wood | 159/47 |
| 4,431,433 | 2/1984 | Gerlach et al. | 55/228 X |
| 4,689,053 | 8/1987 | Heath | 95/231 X |
| 4,948,010 | 8/1990 | Wiggins | 220/855 |
| 5,084,074 | 1/1992 | Beer et al. | 95/231 X |
| 5,163,981 | 11/1992 | Choi | 55/31 |
| 5,167,675 | 12/1992 | Rhodes | 95/231 X |
| 5,209,762 | 5/1993 | Lowell | 95/231 X |
| 5,269,886 | 12/1993 | Brigham, Sr. | 55/228 X |
| 5,346,537 | 9/1994 | Lowell | 95/231 X |
| 5,453,114 | 9/1995 | Ebeling | 95/231 X |
| 5,490,873 | 2/1996 | Behrens et al. | 95/231 X |
| 5,520,723 | 5/1996 | Jones, Jr. | 95/231 X |

*Primary Examiner*—Robert Spitzer
*Attorney, Agent, or Firm*—Robert K. Rhea

[57] ABSTRACT

An environmentally safe apparatus for reclaiming uncondensed hydrocarbons normally exhausted to the atmosphere from the still column of a glycol dehydrator system, and utilizing the uncondensed hydrocarbons as fuel in the burner of a reboiler fire-tube by natural draft of the fire-tube exhaust stack.

5 Claims, 2 Drawing Sheets

METHOD AND APPARATUS UTILIZING HYDROCARBON POLLUTANTS FROM GLYCOL DEHYDRATORS

BACKGROUND OF THE INVENTION

1. Field of the Invention

This invention relates to glycol dehydrators and more particularly to a method and apparatus which eliminates noxious gasses normally exhausted to the atmosphere from the still column of a gas dehydrator.

Natural gas produced from gas wells contains entrained water and oil droplets, water vapor, and condensable hydrocarbons.

It is necessary to remove the water and water vapor from the natural gas before it passes into a pipeline to prevent clogging and corrosion of the pipeline and downstream equipment.

Glycol dehydrators are used to remove water and water vapor from gas by contacting the wet gas with glycol absorbing the water and vapor. The desiccant then flows to a reboiler regenerating the glycol by driving off the water vapor, allowing the reconcentrated desiccant to be returned to the dehydration phase.

An unintentional by-product of the dehydration process is the absorption of hydrocarbons with water and water vapor. These hydrocarbons are normally released to the atmosphere with water vapor from the regenerator. Many of these aromatic hydrocarbons are hazardous to the environment, benzene, ethylbenzene, toluene, and xylene for example.

2. Description of the Prior Art

Some prior patents, such as U.S. Pat. No. 3,875,019 issued Apr. 1, 1975 to Cocuzza et al, and U.S. Pat. No. 5,163,981 issued Nov. 17, 1992 to Choi, disclose removing noxious gasses from the vapors emitted by a still column from a reboiler and passing these noxious gasses to the burner of the reboiler. However, a problem occurs in admitting the gasses to the reboiler burner and obtaining combustion since these noxious gasses do not readily burn, as does natural gas. This invention overcomes this problem.

The majority of the prior art patents are directed toward the reclaiming and/or reconcentrating ethylene glycol.

U.S. Pat. No. 4,273,620 issued Jun. 16, 1981 to Knobel, U.S. Pat. No. 4,225,394 issued Sep. 30, 1980 to Cox et al, and U.S. Pat. No. 4,322,265 issued Mar. 30, 1982 to Wood, are considered good examples of the further state-of-the-art in reclaiming and reconcentrating used ethylene glycol.

SUMMARY OF THE INVENTION

A glycol dehydrating system includes a reboiler having an upstanding still column receiving vapors having temperatures as high as 350° F. In this invention the still column vent is closed to prevent the normal escape of noxious gasses and water vapor. These vapors are piped through a heat exchanger sized to drop the temperature to less than 150° F. The condensed water and condensable hydrocarbons flow by gravity to tank storage through a self emptying container. The remaining hydrocarbon vapors flow through a secondary separator to remove remaining liquids, and through either of two thermostatically controlled valves for use as dehydrator fuel. In some installations, the uncondensed hydrocarbons have been found to be of sufficient quantity to substantially fuel the dehydrator, replacing the natural gas normally used for fuel.

The principal object of this invention is to provide an apparatus which will recover heretofore environment polluting uncondensed hydrocarbons by separation from water vapor and utilizing the hydrocarbons as auxiliary fuel in a gas dehydration process and which utilizes the natural draft of an exhaust stack and fuel gas pressure as the power source. A further object of the invention is to provide an apparatus for commingling normally wasted noxious gas and air at the dehydration reboiler fuel burner entrance.

DESCRIPTION OF THE PREFERRED EMBODIMENTS

Figure 1:
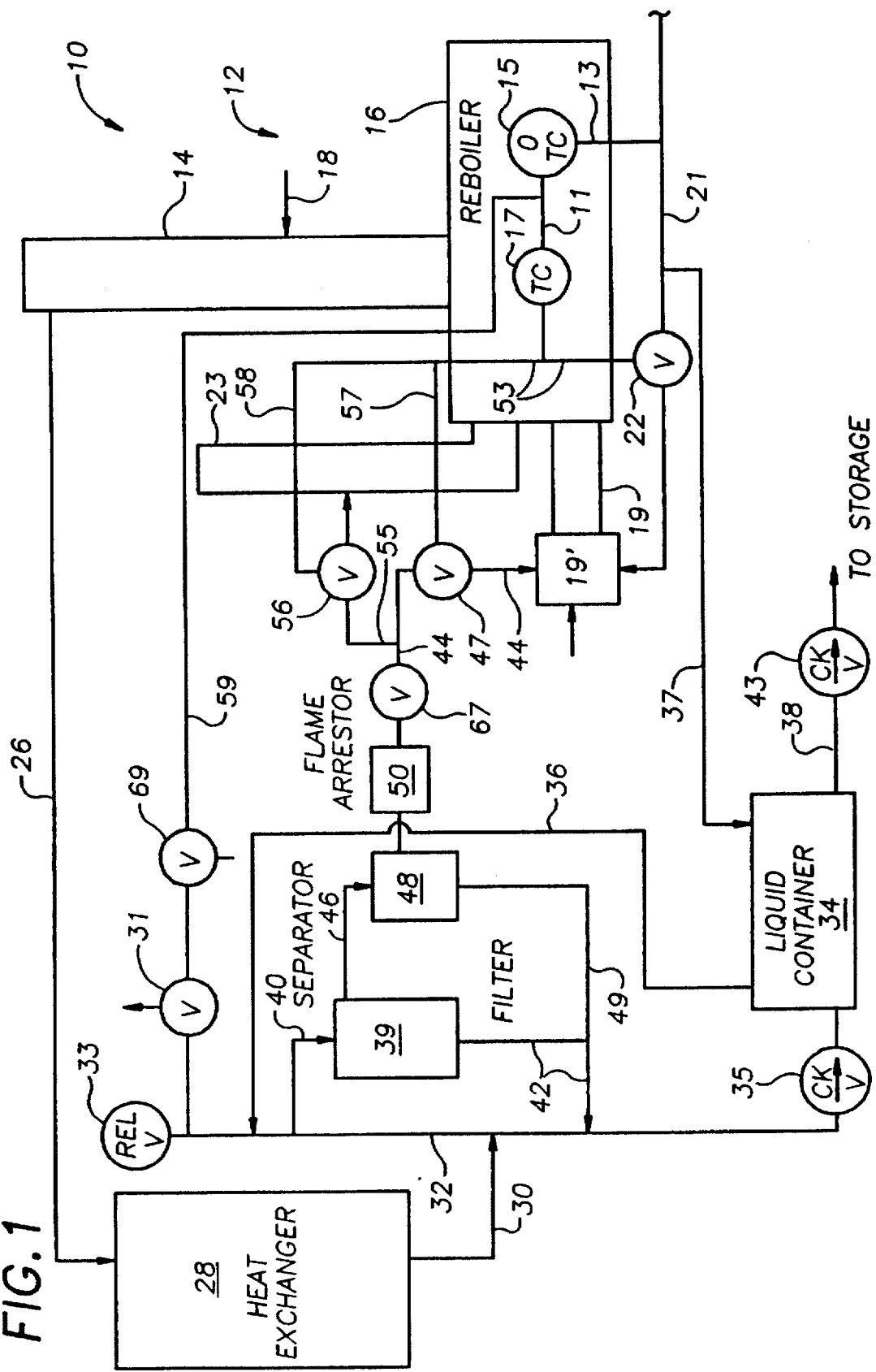
FIG. 1 is a schematic of the apparatus.

Like characters of reference designate like parts in those figures of the drawings in which they occur.

Figure 2:
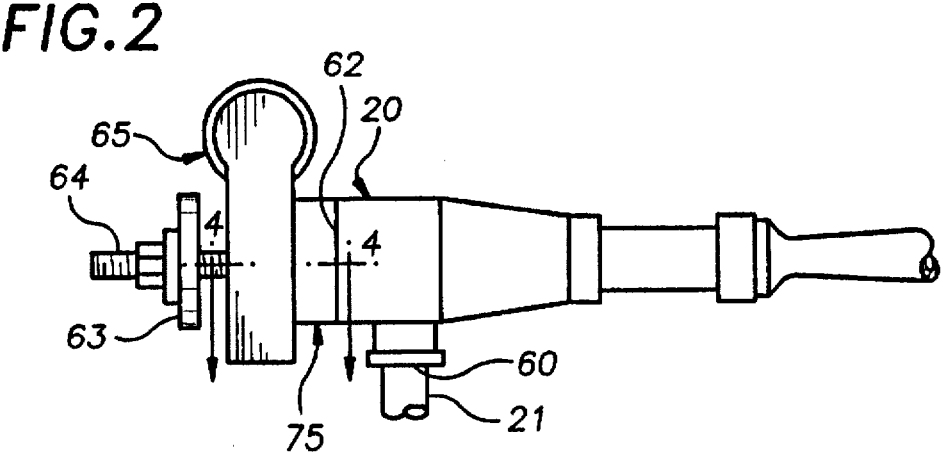
FIG. 2 is a fragmentary side elevational view of a dehydration reboiler fuel and air mixing fire-tube burner inlet tube connected with a noxious gas and air mingle unit.
Figure 3:
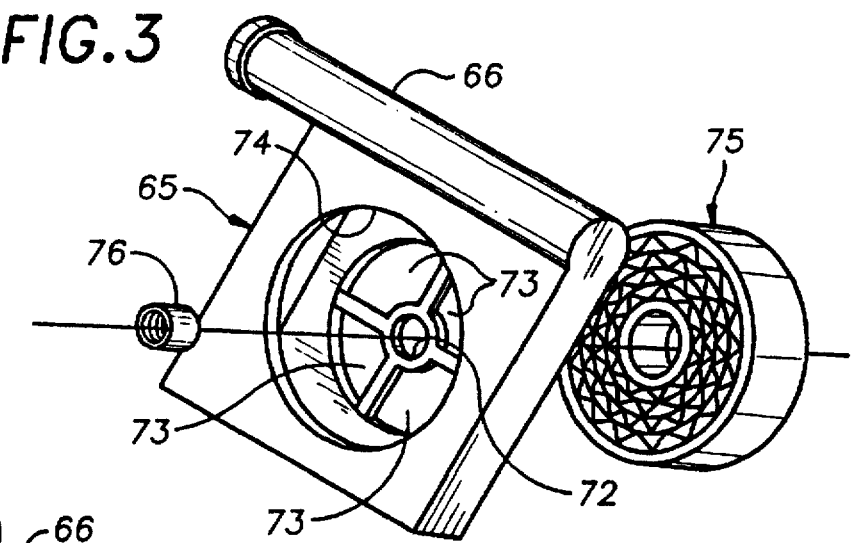
FIG. 3 is a fragmentary exploded isometric view of the noxious gas and air mingle unit, per se; and, FIG. 4 is a vertical cross sectional view taken substantially along the line 4—4 of FIG. 2.
Figure 4:
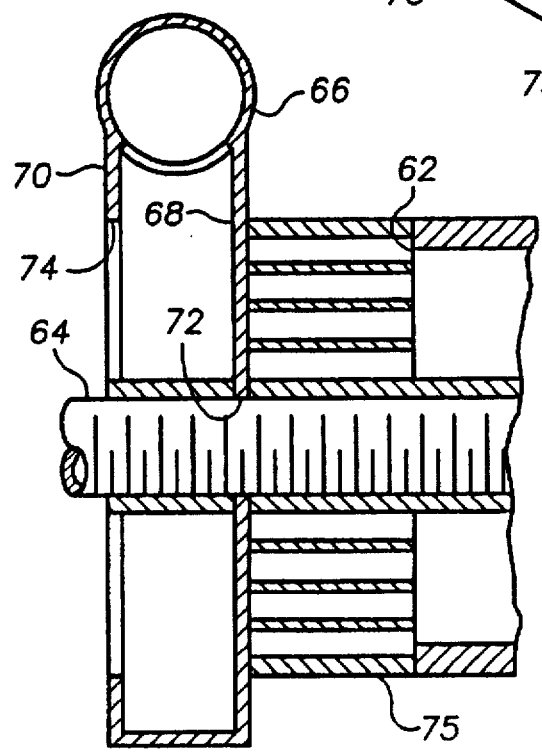

In the drawings:

Referring first to FIG. 1, the reference numeral 10 indicates the apparatus as a whole which includes a glycol regenerating apparatus 12 comprising a reboiler 16 having an over temperature controller 15, and a thermostatic temperature controller 17 and having a still column 14 mounted thereon receiving wet glycol from a contactor tower, not shown, via a line 18. The reboiler 16 contains a fire-tube 19 having a burner 20 (FIG. 2), in its burner entrance 19', supplied with fuel gas by a line 21 having a fuel control valve 22 and terminating in an upstanding exhaust stack 23 for heating the glycol.

Water vapor and aromatic hydrocarbons vaporized from the wet glycol are normally exhausted to the atmosphere through a vent, not shown, in the wall of the still column 14. However, in this invention, the still column vent is closed, and water vapor and aromatic hydrocarbon gasses pass via a line 26 to an air cooled heat exchanger or vapor condenser 28 where the vapor volume is reduced by condensation.

The terms "line" and "piping" as used herein refer to tubular pipes for conducting fluids.

Liquids flow by gravity from the vapor condenser through a drain line 30 to a standpipe 32 which drains to a self emptying liquid container 34 through a check valve 35. The upper end portion of the standpipe is normally closed by a thermostat controlled fluid pressure valve 31 and a pressure relief valve 33. Air vapor or gas displaced by liquid entering the liquid container 34 is vented to the upper end portion of the stand pipe 32 via a line 36. The self emptying liquid container 34 is fully disclosed in U.S. Pat. No. 4,948,010, incorporated herein by reference. The container 34 is connected with the fuel gas line 21 via line 37 so that a float, not shown, within the container 34 opens an internal valve, similarly not shown, when the float is lifted to a predetermined level by contained liquid to allow gas pressure from the line 37 to discharge contained liquid to storage through a check valve 43 in a drain line 38.

Vapor and aromatic hydrocarbon gasses in the upper end portion of the stand pipe 32 pass to a separator 39 via a line 40. Condensed liquids in the separator drain by gravity through a line 42 to the depending end portion of the stand pipe 32 and to the liquid container 34. Hydrocarbons leaving the separator 39 are filtered by a filter 48 in a conduit 44 connected to the burner 20 through a normally open thermostat control valve 47. Separated liquids in the filter 48 drain to the separator drain line 42 via a line 49. A flame arrestor 50 is interposed in the conduit 44 downstream from the filter 48. A branch line 55, connected with the conduit 44 upstream from the valve 46 diverts gasses, under certain conditions as presently explained, to the exhaust stack 23 through a normally closed thermostat controlled valve 56.

The over temperature controller 15 is connected with the fuel gas supply 21 upstream from the valve 22 by a line 13 and with the thermostatic temperature control 17 by a line 11. During normal operation, the temperature control 17 supplies fuel gas pressure to operate the valves 22, 46, and 56, by gas piping 53, 57 and 58, respectively. Other gas piping 59 connects the line 11 to the vent valve 31. In the event of reboiler temperature above a predetermined limit, the over temperature controller 15 removes gas supply pressure to the thermostat temperature control valve 17 and vent valve 31, thus closing fuel and uncondensed hydrocarbons supply valves 22 and 46, and opening exhaust stack valve 56 and vent valve 31.

Referring also to the remaining Figures, the burner 20 is provided with an inlet opening defined by a laterally projecting boss 60 connected with the fuel line 21. The fuel burner mixer end 62 is open for admitting air to be mixed with the fuel from the line 21, the quantity of air being manually adjusted by a baffle plate 63 on a threaded stem 64.

An aromatic gas and air mingle element 65 is interposed between the burner end 62 and the air inlet control plate 63. The mingler 65 is provided with a tubular end portion 66 which receives aromatic gasses from the conduit 44. The mingle element 65 has opposing side walls 68 and 70 provided with axially aligned openings 72 and 74 surrounding the burner stem 64. The wall forming the side wall opening 72 slidably surrounds the burner stem 64. The side wall 68 is provided with a plurality of radial openings 73, four in the example shown, admitting gas from the mixer 65 to the burner 20. The diameter of the side wall opening 74 is substantially equal with the diameter of the baffle plate 63.

A cylindrical flame arresting element 75 is axially interposed between the burner end 62 and the mingler side wall 68. A nut 76 on the stem 64 holds the side wall 68 in contact with the adjacent surface of the element 75. In addition to its flame arresting characteristics, the element 75 acts to thoroughly mix or commingle the aromatic gasses with air to form a combustible mixture as they enter the burner 20. A manually operated control valve 67 is interposed in the conduit 44 downstream from the flame arrestor 50, and a manual bleed valve 69 is interposed in the gas piping 59 upstream from the vent valve 31.

As an example, the above described system was installed on a glycol dehydrator and operated for 90 days. The dehydrator has a 375,000 BTU heater, a 30 inch contactor, and dries 20 mmcf natural gas per day. Gas temperature is 110° F. Contactor pressure is 1,000 psi. Total liquid hydrocarbons recovered, 3.33 bbls/day×90=299.7 bbls. Total natural gas fuel saved by using the aromatic hydrocarbons as fuel is: 18 mcf/day×90=1.620 mmcf.

Under normal conditions the apparatus continuously operates under a predetermined temperature controlled by the temperature controller 17. In the event of a malfunction, such as the temperature rising or falling to a temperature range beyond the setting of the temperature control, the over temperature controller 15 closes the burner valve 22 and uncondensed hydrocarbon gas valve 47 and opens the uncondensed hydrocarbon gas valve 56 to the exhaust stack 23 and opens the vent valve 31 to atmosphere. Uncondensed hydrocarbon gasses diverted to the exhaust stack are mingled with a thermal draft in the presence of an igniter, not shown.

Obviously the invention is susceptible to changes or alterations without defeating its practicability. Therefore, we do not wish to be confined to the preferred embodiment shown in the drawings and described herein.

We claim:

1. In a method for recovering water and aromatic hydrocarbons evaporated from glycol in a still column mounted on a reboiler, having a fire-tube provided with a fuel and air intake end, in a glycol regenerating apparatus, the improvement comprising:
   (a) passing water and hydrocarbons vapor from said still column to a vapor condenser;
   (b) passing uncondensed vapors from said vapor condenser to a condensate separator;
   (c) passing effluent from said vapor condenser and said separator to a self emptying container; and,
   (d) passing non-condensable hydrocarbon vapors from said condensate separator through a hydrocarbon vapor and air mingler at the fuel and air intake end of the fire-tube in said reboiler, whereby the only gaseous discharge from the reboiler regenerating apparatus is combustion products from the reboiler fire-tube.

2. The method of claim 1 wherein said vapor condenser is an air cooled condenser.

3. In an apparatus for recovering water and aromatic hydrocarbons evaporated from glycol comprising a glycol regenerating apparatus including a still column, said regenerator apparatus also including an over temperature controller and a thermostat temperature control on a reboiler section having a fire-tube therein including a burner having a fuel and air intake end portion and an opposite exhaust stack end portion extending therefrom, the improvement comprising:
   a water and hydrocarbon gas vapor condenser means downstream from said still column including separate outlets for water and condensed hydrocarbons and uncondensed hydrocarbons;
   an uncondensed hydrocarbons separator downstream from said vapor condenser and having separate outlets for water and condensed hydrocarbons and uncondensed hydrocarbons;
   a self emptying to storage liquid receiving container down stream from the water and condensed hydrocarbons outlet of said vapor condenser and said separator;
   a conduit extending from said separator for conveying uncondensed hydrocarbons to said burner; and,
   an air and uncondensed hydrocarbons mingle means interposed between said conduit and said burner for forming a combustible mixture entering said burner.

4. The apparatus according to claim 3 and further including:
   pipe means connecting burner fuel gas with said container for displacing condensate therein; and,
   a vent tube connecting said container with the vapor condenser uncondensed hydrocarbons outlet.

5. The apparatus according to claim 4 and further including:
   a first normally closed valve on said vapor condenser outlet upstream from the uncondensed hydrocarbons outlet;
   a second normally open valve interposed in said conduit
   a third normally closed valve and tubing interposed between said conduit and said reboiler exhaust stack upstream from said second valve; and,
   reboiler fuel gas piping means connecting said temperature controller with said first, second and third valves for opening said first and third valves and closing said second valve, respectively, in response to a temperature malfunction.

* * * * *